United States Patent [19]

Ouimet et al.

[11] 4,106,636

[45] Aug. 15, 1978

[54] RECIRCULATION BUFFER SUBSYSTEM FOR USE IN SORTING AND PROCESSING ARTICLES INCLUDING MAIL FLATS

[75] Inventors: Raymond Joseph Ouimet, Downingtown; Edward Arthur Wojtowicz, Bryn Mawr; George Edward Lund, Berwyn; Ermenegildo Fiorentino, Bridgeport, all of Pa.

[73] Assignee: Burroughs Corporation, Detroit, Mich.

[21] Appl. No.: 744,613

[22] Filed: Nov. 24, 1976

[51] Int. Cl.² .......................................... B65G 43/00
[52] U.S. Cl. .................................. 214/11 R; 104/88; 209/74 M
[58] Field of Search ............................ 214/11 R, 11 C; 209/74 M; 104/88

[56] References Cited

U.S. PATENT DOCUMENTS

| | | | |
|---|---|---|---|
| 3,260,349 | 7/1966 | Vander Meir | 214/11 R |
| 3,561,623 | 2/1971 | McCaul | 214/11 R |
| 3,610,159 | 10/1971 | Fickenscher | 214/11 R |
| 3,837,484 | 9/1974 | Ruckebier et al. | 214/11 R |
| 3,884,370 | 5/1975 | Bradshaw et al. | 214/11 R |

*Primary Examiner*—Lawrence J. Oresky
*Attorney, Agent, or Firm*—Francis A. Varallo; Edmund M. Chung; Kevin R. Peterson

[57] ABSTRACT

The present disclosure involves a system for storing and processing articles such as mail flats which cannot be processed on standard letter mail equipment. The system includes mechanical carriers for transporting and remaining with the articles throughout the processing cycle. A recirculation buffer subsystem provides temporary high density random storage which dynamically allocates the system output resources through computer control. In the buffer, the destination-encoded carriers are kept continuously moving in a closed serpentine path. Based upon system priorities, selected carriers may be taken out of buffer storage independently of the other carriers and the former reassigned to output accumulation racks where they remain until outputted from the system. The recirculation buffer subsystem provides a balance between system input and output, thereby substantially improving efficiency and providing savings in cost and space requirements.

16 Claims, 3 Drawing Figures

RECIRCULATION BUFFER SUBSYSTEM FOR USE IN SORTING AND PROCESSING ARTICLES INCLUDING MAIL FLATS

CROSS REFERENCE TO RELATED APPLICATION

The present application is closely related to U.S. Pat. No. 3,884,370, which issued upon application Ser. No. 401,954, entitled "System for Sorting and Processing Articles Including Flat Mail Pieces" by Robert S. Bradshaw et al. This patent is assigned to the same assignee as the present application.

BACKGROUND OF THE INVENTION

In the reference patent, there is described and claimed a system for sorting and processing articles of varying descriptions and physical sizes and weights. More particularly, the system finds application in sorting machinable mail flats. Three major components are utilized, namely, a mini-carrier to support each item to be processed, a monorail conveyor to transport the carriers, and magnetic coding on the carriers to provide control data.

In operation, the mail flats arrive at an induction station, where each flat is clipped to a waiting mini-carrier. The flat is then advanced to a viewing station where an operator keys the desired code, based, for example, on the ZIP code destination of the flat. At an encoding station further downstream, a destination code determined by the operator-keyed data is encoded on the carrier's magnetic stripe. The flat then enters the conveyor distribution system in which code readers read the escort memory data on the carrier's stripe and direct the flat via appropriate gating to a storage destination or output accumulation rack to await a secondary sort or alternately, an output when the rack if full or a sweep is otherwise desired. Such a system finds particular application in large installations where space allocation for the required large numbers of storage destinations presents no problem. Small and medium Post Offices, for example, may not be able to avail themselves of the system due to space limitations.

In considering solutions to the space problem, it was noted that during actual operation, the storage destinations (output accumulation racks) of the referenced patented system were seldom filled to capacity and more often remained approximately half full. Therefore, 50% of the storage space in the racks remained unused. Moreover, the many relatively small storage destinations did not offer the economy of storage space utilization which might be achieved in a few larger storage mediums.

The recirculation buffer subsystem of the present invention provides an efficient and cost effective solution to the aforementioned space problem.

SUMMARY OF THE INVENTION

In accordance with the invention, a recirculation buffer subsystem is introduced into the system of the aforementioned Bradshaw et al patent, the details of which are to be considered incorporated herein by reference.

Briefly, the principal difference between the system of the reference patent and the present recirculation buffer system is the incorporation of one or more recirculating buffers between the induction stations and the output accumulation racks, together with the necessary additional control. The recirculating buffer offers a means of temporarily storing flats on carriers such that any flat may be taken out of storage independently of any other. This is accomplished by providing a closed serpentine conveyor path such that all flats are continuously moving. If a specific flat is requested, the carrier and the flat attached thereto are caused to exit the buffer after passing a reader which identifies the flat in accordance with the destination data stored on the carrier escort memory. A record is kept by the system computer of the data associated respectively with all of the flats in the buffer in order that control may be provided. Thus, the computer functions to maintain a balance between output and input and provides to the output packaging, or traying subsystem, the most productive stack sizes available in the system. This is accomplished through the establishment of a hierarchy of priorities, such as the flat count or stack thickness per destination. To achieve the most productive stack sizes, the recirculation buffer subsystem is normally operated in a substantially saturated condition.

Other features and advantages of the present system will become apparent in the detailed description appearing hereinafter.

DESCRIPTION OF THE PREFERRED EMBODIMENT

SYSTEM OPERATION

Figure 1:
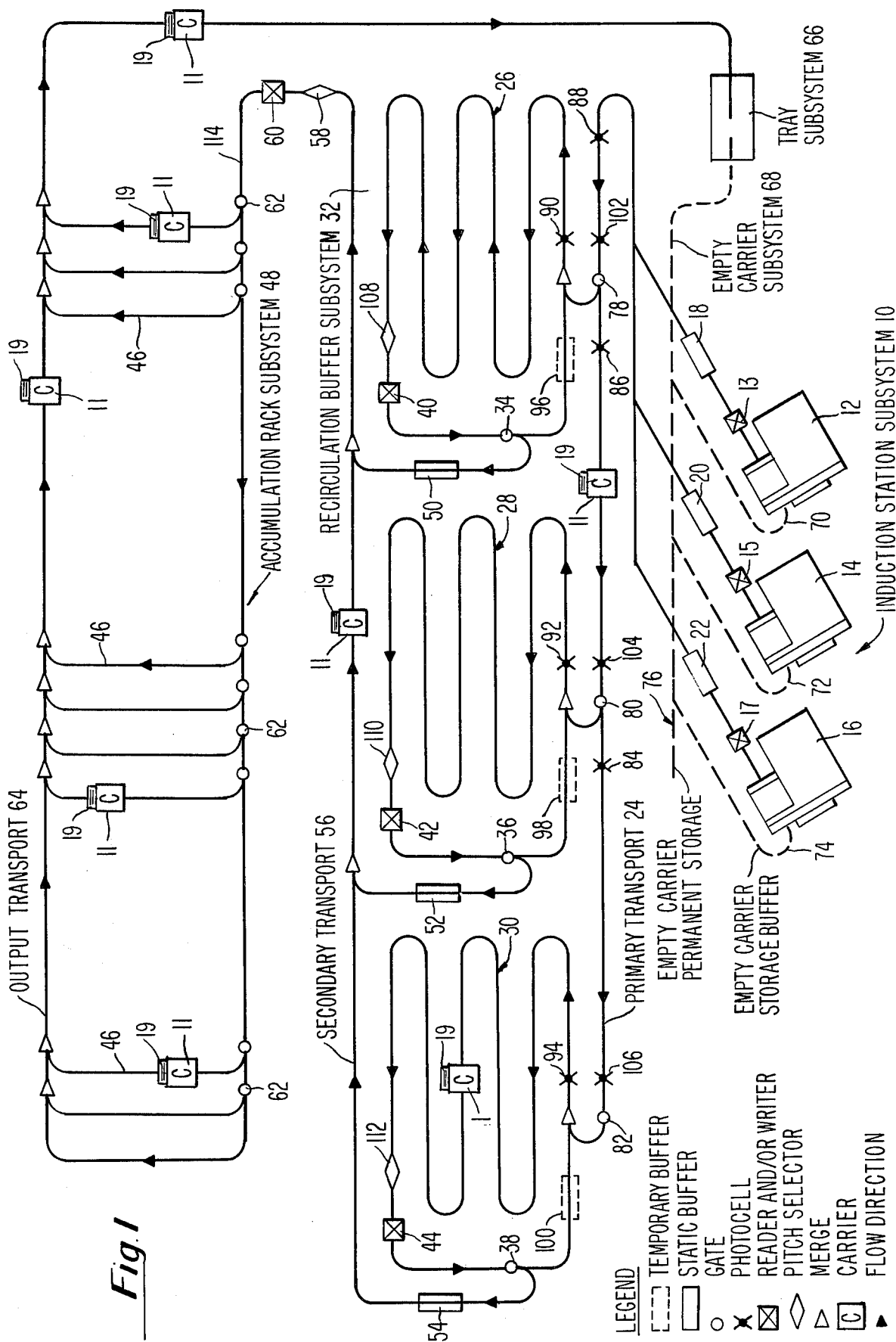
FIG. 1 is a diagrammatic illustration of the flat sorter system of the present invention with particular emphasis on the sorting and processing of articles within the recirculation buffer subsystem.

FIG. 1 depicts for purposes of example a three position, 125 destination flats sorter with typical recirculation buffer flow diagrams. The major subsystems include those identified with the induction station, recirculating buffer, output accumulation rack, tray and empty carrier.

Initially, the carriers 11 (such as those shown and described in the reference patent) and the respective articles which they will transport throughout the system are processed by the three induction stations 12, 14 and 16 of the induction station subsystem 10. The destinations and thicknesses of the respective carriers are written upon the magnetic media which they bear by write stations 13, 15 and 17. The carriers are then accumulated in static buffers 18, 20 and 22 at the outputs of the stations. The last mentioned buffers are then cleared at regular intervals, creating a train of batches on the primary transport 24. For example, a batch may include approximately ten carriers. As will be described in greater detail hereinafter, the carriers 11 fill the recirculating buffers 26, 28 and 30 of the recirculation buffer subsystem 32 on a demand feed basis which is under local control. The buffer 26 closest to the input to the primary transport 24 is filled first. It should be noted that there is no necessity to fill the recirculating buffers evenly or to pre-sort at this level. The batches enter the recirculating buffers and are accumulated in high density random order. Under computer control the carriers are permitted to accumulate in the recirculating buffers until either a predetermined stack size or number of carriers for a particular assigned destination are made to output the recirculating buffers. Alternately, the recirculating buffers may be permitted to saturate while the computer searches for the priority stack size. In the latter case, at saturation, or slightly before, the system will output the largest stack sizes available and will balance the output processing rate against the input rate. Destinations selected for output by the computer are diverted at gates 34, 36 and 38 after the associated read-write stations 40, 42 and 44 where the thicknesses and destinations of all of the carriers are read in search for the selected destinations. The number of a particular output accumulation rack 46 within the output accumulation rack subsystem 48 is written on each carrier at the read-write station depending on its selected destination. The carrier is then diverted into the static output buffers 50, 52 and 54 associated respectively with the recirculating buffers. The buffers 50, 52 and 54 are polled at regular intervals under local control and the carriers are directed from each of the latter buffers onto the secondary transport belt 56. The carriers proceed on belt 56 to the pitch selector 58 at the input to the accumulation rack subsystem 48. Here the carriers are alternately restrained and permitted to advance in order to achieve a predetermined spacing. As the spaced carriers leave the pitch selector 58, they pass a read station 60. The latter decodes the output accumulation rack number from the carrier's escort memory and directs the carrier to the proper accumultion rack 46 by allowing actuation of the appropriate gate 62.

When the predetermined number of carriers, or alternately, a predetermined thickness of a stack of carriers is diverted from the recirculation buffer subsystem 32, the computer elimintes the destination associated with these carriers from a queue, as explained in detail hereinafter, thereby inhibiting any further flow of carriers for that destination into the output stream.

As soon as an output accumulation rack is filled, it notifies the computer of its status and the latter assigns a space on the output transport belt 64, in the same manner as the endless belt concept employed in the reference patented system. When that space on the belt passes the designated accumulation rack 46, the carriers are outputted onto the output transport belt 64 in a batch to the tray subsystem 66. The carrier output rate on the belt 64 is a function of the input rate and average stack sizes. The empty carriers are then returned via the empty carrier subsystem 68 to the induction stations 12, 14 and 16 where they remain available for use in respective storage buffers, indicated generally at points 70, 72 and 74 of the empty carrier subsystem 68. If desired, certain of the carriers may be designated for "permanent" storage, thereby bypassing the induction stations and being stored along line 76.

Each of the subsystems and transports mentioned hereinbefore will now be considered in greater detail. It should be noted that the characteristics presented herein, relating, for example, to specific configurations and quantities of system elements, have been chosen for purposes of example, and are not to be considered limitative of the inventive concepts taught herein.

INDUCTION STATION SUBSYSTEM

The controls necessary for the functions performed by the induction station subsystem 10 are similar to those described in the referenced patent. The controls are divided between those involved with local mechanization and computer controls for information handling and escort memory writing.

It will be assumed that the flats are processed through an induction station at a rate of fifty carriers per minute. The total input rate for the three induction station system depicted in FIG. 1 is therefore one hundred fifty flats per minute. The operator entry is identical to that described in the referenced patent. The ZIP code is translated in the computer and the destination written on the carrier escort memory 19 by write stations 13, 15 and 17. The thickness of the document being transported by the carrier is also written on its escort memory by the last mentioned stations. Similar data is entered into the computer and is stored in tables of the carrier management software, described hereinafter.

The carriers 11 are then accumulated in static buffers 18, 20 and 22. The buffers are swept at regular intervals, sweeping whatever carriers are available therein. If the operators are operating at fifty documents per minute, there will be ten flats per sweep per station. These batches are then transported to the recirculation buffer subsystem 32 by way of the primary transport 24.

PRIMARY TRANSPORT

The primary transport 24 is a flat belt which travels at approximately 18.5 inches per second and receives batches of carriers at regular intervals from the induction station buffers 18, 20 and 22. The primary transport travels the length of the system to deliver carriers to each of the recirculating buffers 26, 28 and 30.

In addition to transporting carriers 11 to the recirculating buffers, the primary transport 24 can be used as a temporary buffer along its entire length to handle unique conditions when the recirculating buffers may be saturated and cannot purge for a brief period of time. The primary transport can buffer eight hundred carriers, which is approximately 5.5 minutes of buffering at the maximum input rate. Buffer solenoids are provided at gate points 78, 80 and 82 along with photocells at 84, 86 and 88. The buffering occurs along transport 24 between points 82-84, 80-86 and 78-88. The photocells at points 84 and 86 serve to detect the last carrier in the buffer line and energize the solenoid upstream in order to keep the gates at points 80 and 78 clear, while the photocell at point 88 prevents any further accumulation which may interfere with batch input from induction station 12.

The buffering in the primary transport functions as follows. Carriers 11 moving along the transport path are not required by recirculating buffers 26, 28 or 30. The carriers continue to move down the transport path to gate 82 and are stopped there by the buffer solenoid. Carriers continue to accumulate along the length of transport 24 between points 82-84 unless diverted by recirculating buffers 26 or 28. When the carriers reach the photocell at point 84, the solenoid at gate 80 is energized, keeping the latter gate clear of carriers. Accumulation of carriers then continues along the transport path between points 80-86. This process continues until the system saturates or the recirculating buffers begin to output.

Carriers 11 on the primary transport 24 are not included as candidates for output until such time as they are inserted into the recirculating buffers. This is done to eliminate the possibility of delayed carrier arrival at the output due to the long pipeline from the induction station buffers 18, 20 and 22 to the output accumulation rack subsystem 48. The flats in the induction station buffers are accounted for by accumulating the flats data (thickness and count) in a temporary table assigned for carriers in each induction station buffer. When the carriers are released from the buffer, the corresponding table, after an appropriate delay for transit time, will be transferred to the system destination tables.

RECIRCULATION BUFFER SUBSYSTEM

The system 32 is composed of multiple storage buffers 26, 28 and 30 which permit carrier accumulation for the purpose of selecting batches to be outputted to output accumultion racks 46. The more specific functions of this subsystem are: (a) to provide high density (close packed 1-⅛ inch centers) recirculating storage of loaded carriers; (b) to provide for batch acceptance into the buffer; and (c) to provide for single carrier exiting for output based on destination queues being established by the control system. The queue is a list of candidate destinations for outputting to the accumulation racks 46, based on greatest number available, on thickness accumulation, or on the use of a forced-clear algorithm in all recirculating buffers of the system as explained hereinafter.

The cycle of operation of the recirculating buffers is as follows. Photocells positioned respectively in the recirculating buffers at points 90, 92 and 94 monitor the buffers' ability to accept batches from the primary transport 24. When batch insertion is to be made into one of the recirculating buffers, the following sequence takes place automatically.

Temporary buffers will be created at respective locations 96, 98 and 100 based on which recirculating buffer is about to receive the batch. The purpose of this temporary buffer is to inhibit recirculation in the buffers 26, 28 or 30 for the period required to complete batch insertion without interrupting the flow at 34, 36 or 38. Inhibiting of carrier flow at locations 96, 98 and 100 is accomplished by energizing a solenoid in each of the temporary buffers.

Photocells 102, 104 or 106 at each recirculating buffer entry point detect the leading edge of a batch before arrival at diverting gates 78, 80 or 82. These photocells signal the control system to divert the appropriate buffer gate within the space provided between batches.

The batch is then diverted from the primary transport 24 and is merged into the recirculating buffer 26, 28 or 30 at 18.5 inches per second. Completion of insertion is detected and permits de-energization of inhibit solenoids in buffers 96, 98 or 100 and the reinstatement of gates 78, 80 or 82 to their non-diverting position.

The recirculating buffer is a serpentine arrangement of friction drive belts which has the ability to drive carriers in a non-positive manner. This arrangement of belts then has the ability to slip in respect to accumulated carriers, when flow is inhibited. Batch input flow at 18.5 inches per second in the beginning of the buffer-filling sequence is uninhibited until the carriers reach the pitch selectors 108, 110 or 112. These pitch selectors alternately restrain and permit advancement of the carriers, thereby converting the close-packed batch input flow into single carrier, spaced output flow at a maximum rate of 3.36 documents/second. Because close-packed batch flow can be as high as 16 documents/second while the pitch selector is limited to 3.36 documents/second, carriers will accumulate at this point. This accumulation will keep increasing in length until the buffer fills all of its storage convolutions up to the point of input. The pitch selectors operate continuously to dispense carriers and therefore create an intermittent recirculation within the buffer.

The purpose of pitch selectors 108, 110 and 112 is to create a separation of 5.5 inches between carriers to permit the gating of individual carriers into holding buffers 50, 52 and 54.

Carriers 11 to be outputted from the recirculation buffers are gated at points 34, 36 and 38 if they form part of the destination queue. All remaining carriers re-enter the buffer, in a spaced condition, and accumulate in a close-packed condition at the end of the storage line.

The function of the reader portion of the read/write stations 40, 42 and 44 on the output sides of pitch selectors 108, 110 and 112 is to determine what destination and document thickenss is stored on the carrier escort memory card. This information is supplied to computer 21 (FIG. 2) where the destination of the carrier is compared with the list of destinations in the Assigned Accumultion Rack Table 57 (FIG. 3). The latter destinations have met predetermined outputting criteria stored in the computer software. Moreover, each destination has been assigned an output accumulation rack number and carriers for these destinations are eligible for exiting a recirculating buffer.

If a given carrier is bound for a destination selected for output, the writer portion of the last mentioned stations is used by the computer to enter the assigned accumulation rack number to each carrier's escort memory. The control system also uses the magnetic card information to operate diverting gates 34, 36 and 38 at the proper time to divert carriers into static buffers 50, 52 and 54. More specifically, the action of the computer in directing the writer portion of stations 40, 42 and 44 to write an accumulation rack number on the escort memory of a designated carrier, results in the operation of the diverting gates 34, 36 and 38 associated respectively therewith, thereby permitting the last mentioned carrier to exit a recirculating buffer.

Buffers 50, 52 and 54 are designed in a manner that permits batches of carriers to enter into the secondary transport 56 at regular intervals, while at the same time allowing the process of carrier diversion into these buffers to continue. Batches exiting from all recirculating buffers 26, 28 and 30 are merged in the secondary transport 56.

SECONDARY TRANSPORT

The secondary transport 56 is a flat belt travelling at 18.5 inches per second while accepting carriers singly or in batches from the static buffers 50, 52 and 54. The buffers are under local control and output at regular intervals (every 10.7 seconds) on to the secondary transport 56. The timing is arranged such that a space is reserved on the belt for each buffer to merge on to the transport without colliding with the upstream buffer outputs. Since the static buffers are swept at regular intervals, the number of carriers per sweep can range from zero to maximum. The buffer size is designed to accept the maximum input rate from the recirculating buffers at 3.36 documents per second during the time of one cycle, which is 36 carriers. The space allocated on the belt is equal to the maximum number of carriers per buffer that can be accumulated in one complete cycle of the buffers, plus a separation distance required for merging.

The carriers 11 proceed along the secondary transport path to pitch selector 58 where the carriers are pitched on 5.5 inch centers along a timing belt 114 travelling at 18.5 inches per second. The output rate through the pitch selector is 3.36 documents per second. If the recirculating buffers output at a rate greater than the average of 3.36 documents per second, carriers will back up along the secondary transport 56. It can be seen that the input rate from each recirculating buffer can achieve 3.36 documents per second, or a total of 10.08 documents per second, on to the secondary transport path for brief periods. This can be absorbed by using the length of the secondary transport 56 as a buffer or to regulate the output of the recirculating buffers to output rates not greater than 3.36 flats per second. The average rate along the secondary transport is equal to the induction rate of flats, or 2.5 inches per second.

Carriers are processed past the pitch selector 58 along a timing belt at 5.5 inch centers and 18.5 inches per second to the reader 60. The reader will decode the output accumulation rack number on the carrier escort memory and will divert, under local control, the carrier to the appropriate output accumulation rack. Gates 62 are actuated at the proper time to intercept the carrier and divert it into the output accumultion rack 46.

CONTROL SYSTEM

The control system for the present sorting system is similar to that for the reference patented system. Some of the functional elements of the control system are centrally located, while others are concentrated locally in specific subsystems, and still others are distributed throughout the system.

Figure 2:
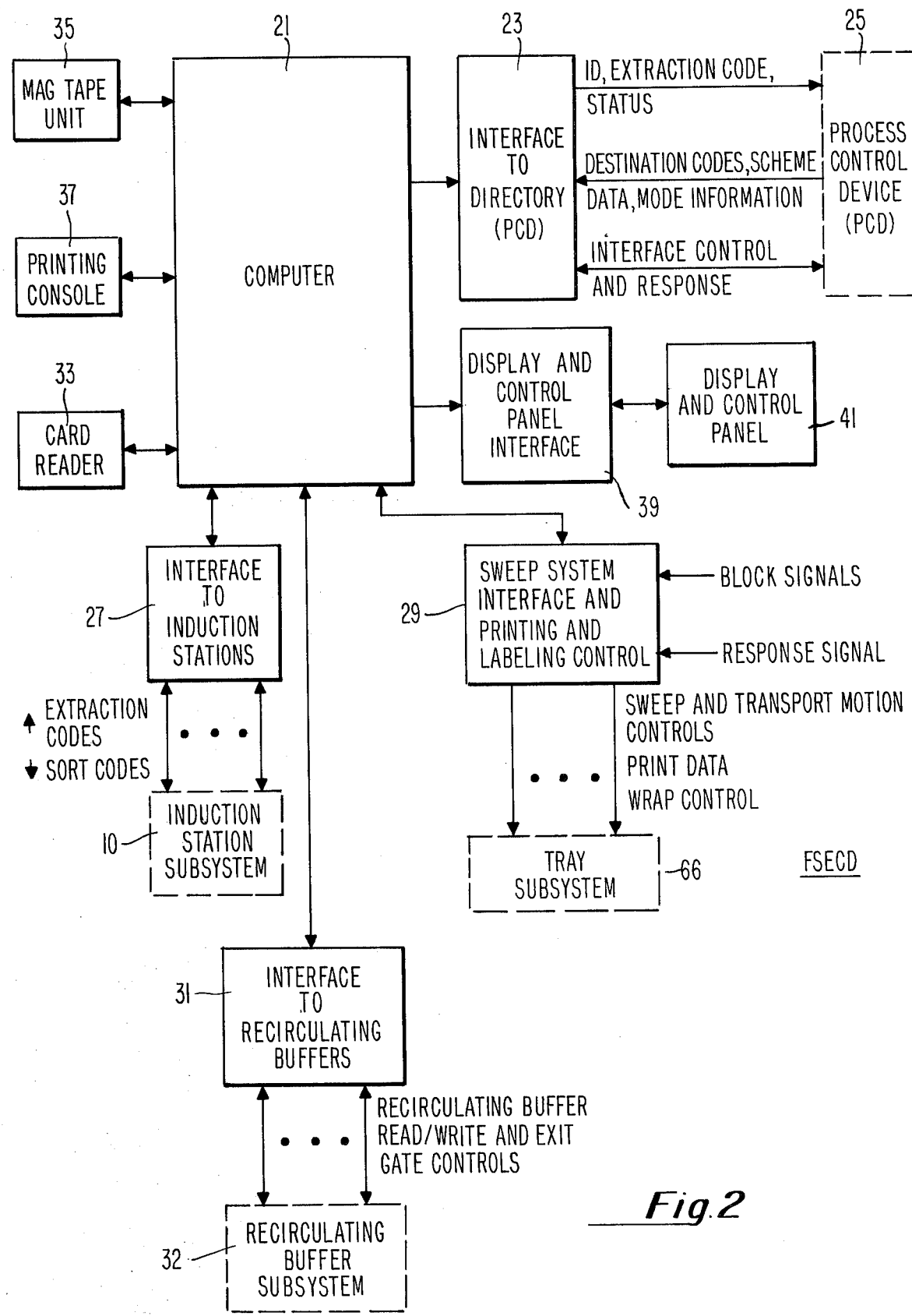
FIG. 2 is a block diagram of control means for use in the system of FIG. 1.
Figure 3:
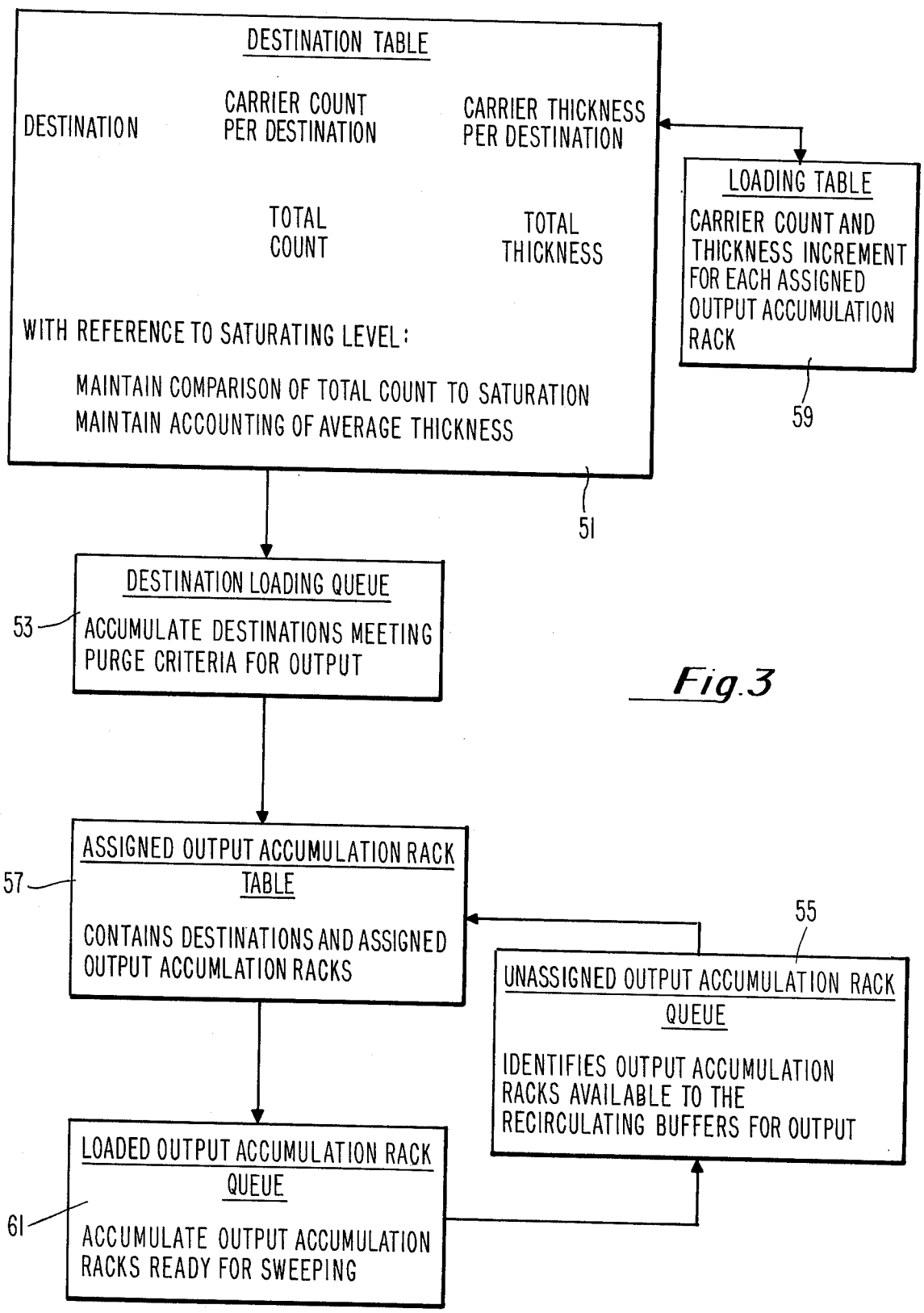
FIG. 3 outlines in block diagram form the carrier management queue tables which comprise a basic software program for operating the system.

The heart of the control system is the Flats Sorting Equipment Control Device (FSECD) depicted in FIG. 2, which synchronizes and unites the remainder of the control system into an integrated whole. A computer 21 provides the FSECD with the ability to flexibly communicate data and commands between the constituents of the sorting system via interface 23 and the Process Control Device (PCD) 25 external thereto.

The computer 21 also performs data translation such as that required to convert sorting information (destination codes) received from the PCD into the form required to control the sort mechanisms (sort codes), which are sent via interface 27 to the induction station subsystem 10. It controls execution of orders from the PCD, such as special commands to output destinations to meet requirements not under local control. Additionally, sweep and transport motion controls, print data, and wrap control are provided via interface 29 to tray subsystem 66. The computer 21 also controls by prearranged criteria, such as document quantity per destination, accumulated document thickness per destination, and time since destination was last outputted, the process of outputting selected carriers from the recirculating buffers, and the assignment of output accumultion racks. This is accomplished by way of interface 31 coupled to the recirculation buffer subsystem 32 and implemented by control of the read/write stations 40, 42 and 44 and exit gates 34, 36 and 38.

The computer 21 also accepts from PCD and stores, or directs storage of, label information and prepares and transmits status and data log information to the PCD. Routing and storage of empty carriers are also managed under program control by the computer. Several peripheral components are provided to augment the system capabilities. These include a punched card reader 33 for program and data entry, a tape memory 35, and a printing console 37 to facilitate two-way communication between the system and operating or maintenance personnel.

Special hardware 39 to interface the computer with the remotely located elements of the control system and the PCD, and a display and control panel 41 complete the completment of centrally located control system elements.

As to the local controls which are unique to the present system, these involve the recirculation buffer subsystem 32, the accumulation rack subsystem 48, and the primary and secondary transports 24 and 56 respectively. For example, photocells 84, 86 and 88, and gates at points 78, 80 and 82 (FIG. 1) control input groups of carriers from the primary transport 24 such that the buffers 26, 28 and 30 will be filled without physical interferences among the carriers. Additionally, each recirculating buffer contains local controls in the form of pitch selectors (108, 110 and 112) to release spaced single carriers into the read/write stations (40, 42 and 44) and static buffers 50, 52 and 54 to merge diverted carriers into the secondary transport 56. In the accumulation rack subsystem 48, the reader 60 will cause the gate 62 to divert, under local control, carriers to the appropriate output racks.

OUTPUT ACCUMULATION RACK SUBSYSTEM

The output accumulation racks 46 are substantially the same assemblies as those of the sort destinations described in the reference patent. There are minor modifications in their mode of operation. A purpose of the output accumulation racks is to provide a method of batching the flats associated with one destination out of a large group of randomly stored destinations. Another purpose is to provide adequate buffering to permit processing of batches at the required frequency of output. In the 125 destination system assumed herein, using three induction stations, an approximate total of thirty-nine output accumulation racks are required.

It should be noted that each of the output racks 46 shown diagrammatically in FIG. 1 may comprise a single bin or a dual bin. In the latter, the storage area of the racks is divided into two sections. The separation is achieved by a solenoid actuated stop. Thus, it is possible to load the section closest to the output transport 64 to its capacity, and have the other section assigned a destination with the number of carriers equal to or less than its capacity. The former section may then be outputted during the time that carrier accumulation is taking place in the other section. Loss of processing time is thus prevented during the outputting cycle in the instances where simultaneous actuation of racks is required. Thus the dual-bin system offers added efficiency in special applications. For most purposes, however, the single bin operation is satisfactory, and may be implemented even in the dual-bin configuration by not energizing the solenoid separating the two sections.

TRAY SUBSYSTEM

The tray subsystem 66 is similar to that employed in the system of the reference patent. One tray subsystem is required for up to three induction stations, while an additional tray subsystem may be required for four induction stations. The output accumulation rack subsystem 48 outputs carriers to the tray subsystem 66 at a rate of one batch every thirteen seconds with an average batch in a flat distribution comprising approximately thirty-three documents. Carrier unloading takes place in the same manner as described in the reference patent, with the stacks accumulating in trays.

EMPTY CARRIER RETURN SUBSYSTEM

Batches of empty carriers 11 exiting from the tray subsystem 66 enter the empty carrier subsystem 68. These carriers are then gated in batch form to supply the empty carrier storage buffers indicated generally at points 70, 72 and 74 of FIG. 1. Although not indicated in the last mentioned Figure, these buffers have photocell sensing means to detect a full condition, which then permits the control system to determine which of the induction stations needs to be supplied. If all buffers are filled, as would occur at the end of an operating shift, the remaining carrier flow would then enter the empty carrier permanent storage along line 76. Storage at the induction stations, plus "permanent storage" line 76, together have the capacity for storing all the carriers of the system. While not illustrated, it is to be assumed that the output of line 76 is merged with the line of the empty carrier subsystem 68, in order that the induction station subsystem 10 may be supplied with carriers during shift start-up.

SOFTWARE

Much of the software and system control described in the reference patent is applicable to the present system. For example, in the induction station subsystem the software is essentially unchanged except that the output accumulation racks are not assigned at the time of induction of the flat. Instead of writing a rack number on the magnetic escort memory of the carrier, a destination number (derived, for example, from a ZIP code) is originated by the operator. Also, in this system, software and control for the areas involved from the output of the recirculation buffer subsystem 32 through the tray subsystem 66, are substantially the same as those required from the induction station output to the tray subsystem in the reference patented system.

The major new element of software is that which controls the recirculating buffers. The software functions to determine the specific destinations to be cleared from the recirculating buffer and to prevent overflow. Most information relating to the contents of the recirculating buffers is not separated by buffer section except that necessary to prevent individual section overflow.

Reference should now be made to the simplified carrier management queue tables illustrated in FIG. 3. Document thickness and destination are acquired at the induction stations 12, 14 and 16 and from this data, the Destination Table 51 is constructed. This table lists and holds the quantity and accumulated thickness of all documents in the recirculation buffer subsystem 32. It is from this population or reservoir that, according to a predetermined but adjustable criteria, such as document count or total thickness of a stack, a decision is made by the computer 21 to exit documents belonging to an assigned destination. As mentioned previously, a common destination may be derived from a ZIP code. The decision to output a particular destination must conform to the general system object of outputting the maximum quantity or thickness of documents to maintain throughput. Thus, since it is desirable to operate close to saturation, the saturation level is entered into the Destination Table 51 for reference and a comparison is maintained of the total carrier count to the saturation level, as well as an accounting of the average thickness.

A listing, or queue, of destinations meeting a precise criteria is collected in the Destination Loading Queue 53 and similarly the Unassigned Output Accumulation Rack Queue 55 will identify unused and therefore available output racks 46.

The information in the two last mentioned queues are merged to generate assignments or destinations to available output racks, and such assignments are stored in the Assigned Output Accumulation Rack Table 57. At this time, carriers 11 passing the read/write stations 40, 42 and 44 of the respective recirculating buffers 26, 28 and 30 and belonging to the destination population listed in the last mentioned table will have their associated rack number, such as a number from "001 to 039", over-written on their escort memory tags.

During this time, the Loading Table 59 is being incremented, keeping account of the number of carriers and thickness build-up in each of the output racks. Concurrently, the Destination Table 51 is being decremented as each document leaves the recirculating carrier population.

When the Loading Table 59 shows that the proper number of carriers have been directed to an assigned output rack, for example "015", the Loading Table 59 and the Assigned Output Accumulation Rack Table 57 are cleared of this particular transaction record and the output rack number "015" is placed in the Loaded Output Accumulation Rack Queue 61. After the output racks, including number "015", are swept, that is outputted to the output transport 64, their availability for reassignment is established by adding their rack numbers to the Unassigned Output Accumulation Rack Queue 55. This completes the normal cycle of control of the recirculating buffers.

Although not shown in FIG. 3, in addition to the above, data may be stored to satisfy a forced-clear algorithm. This data consists of the total number of documents in the recirculation buffer subsystem which are in the Loading Table 59 and the total number of documents in the system. When the ratio of the documents being outputted to the total document count falls below an established threshold, a forced clear is declared. This places the destination with the greatest total thickness in the Loaded Output Accumulation Rack Queue 61, and causes the associated documents to be outputted.

Conclusion

In conclusion, a sorting and processing system characterized by increased efficiency and savings in cost and space requirements has been disclosed in the present application. As in the reference patented system, the inventive concepts and implementations described herein are directed to a system for sorting mail pieces. However, as noted hereinbefore, it should be understood that the system has application in numerous situations where the sorting of articles of diverse character is required. In such situations, changes and modifications may be necessary in the system implementation taught herein. Such changes and modifications, insofar as they are not departures from the true scope of the invention, are intended to be covered by the claims appended hereto.

What is claimed is:

1. A system for sorting and processing articles including flat mail pieces comprising in combination:
   carriers coupled to said articles for providing support therefor and remaining therewith throughout the operation, escort memory means attached to each of said carriers and adapted to receive information regarding at least the destination of the article;

an induction station subsystem including write station means for storing a destination in the escort memory means of each of said carriers;

a recirculation buffer subsystem comprised of at least one recirculating buffer;

primary transport means for transporting said carriers from said induction station subsystem into said recirculating buffer, said last mentioned carriers having respective random destinations and being circulated continuously within said recirculating buffer;

control system means coupled to said induction station subsystem for establishing a destination queue encompassing all of the loaded carriers in the system, and in accordance with predetermined criteria, for selecting carriers associated with a particular destination to be outputted from the recirculating buffer;

read/write means situated within said recirculating buffer and so positioned with respect to the path of travel of said carriers as to read the destination of each carrier as contained in its escort memory;

an output accumulation rack subsystem having a plurality of individually identifiable output racks;

secondary transport means for transporting said carriers from said recirculation buffer subsystem to said output accumulation rack subsystem;

said read/write means within said recirculating buffer being coupled to said control system means and being directed thereby to store in the escort memory of the carriers selected to be outputted from the recirculating buffer, information identifying a particular output rack;

gate means within said recirculating buffer and operatively connected to said control system means for permitting said selected carriers to exit said recirculating buffer and to enter said secondary transport means;

read station means situated along said secondary transport means for reading said output rack information, and gating means situated within said accumulation rack subsystem and responsive to said read station means for causing said selected carriers to enter and be stored in said particular output rack identified in its escort memory.

2. A system as defined in claim 1 further characterized in that said induction station subsystem includes a plurality of induction stations, and static buffer means situated respectively at the outputs of said stations for accumulating carriers in preparation for periodically releasing batches thereof onto said primary transport means.

3. A system as defined in claim 2 wherein said primary transport means comprises a flat belt in which the absence of teeth permits the close packing of the carrier means being transported thereby.

4. A system as defined in claim 3 wherein said recirculating buffer system comprises a plurality of recirculating buffers, said primary transport means including for each recirculating buffer, a gate and photocell combination operatively connected to permit loaded carriers to accumulate along the entire length of said primary transport means while keeping the immediate gate areas free of carriers, said primary transport thereby serving as a temporary buffer as required during system operation.

5. A system as defined in claim 4 wherein an additional photocell is provided at each of said gates to detect the leading edge of a batch of carriers to be inputted to the appropriate recirculating buffer, said last mentioned photocell providing via said control system means that the gate associated therewith will divert the batch of carriers into said appropriate buffer.

6. A system as defined in claim 5 wherein each of said recirculating buffers includes a still additional photocell positioned to monitor the buffer's ability to accept batches of carriers from the primary transport means, and a temporary buffer means to inhibit recirculation in the recirculating buffer for a period of time required for the induction of a batch of carriers into the recirculating buffer from the primary transport means.

7. A system as defined in claim 6 wherein each of said recirculating buffers comprises friction drive belts arranged in a serpentine configuration and characterized in that the belts will slip in respect to accumulated carriers whenever the flow of the latter is inhibited.

8. A system as defined in claim 7 further characterized in that each of said recirculating buffers includes pitch selector means positioned before said read/write means for alternately restraining and permitting advancement of the carriers, thereby converting the close packed batch input flow into single carrier, spaced output flow past said read/write means.

9. A system as defined in claim 8 further including in each recirculating buffer a holding buffer for accumulating a batch of carriers being outputted from the former and for releasing said batch to said secondary transport means at predetermined regular intervals.

10. A system as defined in claim 9 wherein said secondary transport means includes a pitch selector located before said read station means to convert the close packed carrier batch flow to spaced-apart single carrier flow past said read station means.

11. A system as defined in claim 10 wherein said output accumulation rack subsystem includes an output transport means, said carriers stored in said output racks being outputted in batch form to said output transport means in response to a command from said control system means.

12. A system as defined in claim 11 further including a tray subsystem coupled to said output transport means for unloading said carriers.

13. A system as defined in claim 12 further including an empty carrier subsystem coupled to said tray subsystem to receive the empty carriers being outputted therefrom and to supply them to the induction stations, said induction stations each having an empty carrier storage buffer for accumulating carriers until needed.

14. A system as defined in claim 13 further including "permanent" carrier storage means coupled to said empty carrier subsystem for storing the empty carriers remaining in the system after the induction station empty carrier storage buffers are all filled to capacity.

15. A system as defined in claim 14 wherein said control system means comprises a computer and a plurality of interface modules for communicating data and commands between the constituents of the system.

16. A system as defined in claim 1 further characterized in that said write station means in said induction station subsystem stores in the escort memory means of each of said carriers the thickness of the article being supported thereby as well as its destination, said read/write means in said recirculating buffer reading the thickness and destination information contained in the escort memory of each carrier.

* * * * *